Dec. 3, 1957 J. M. FLUKE ET AL 2,814,898
DIVING DUCK DECOYS
Filed May 20, 1954
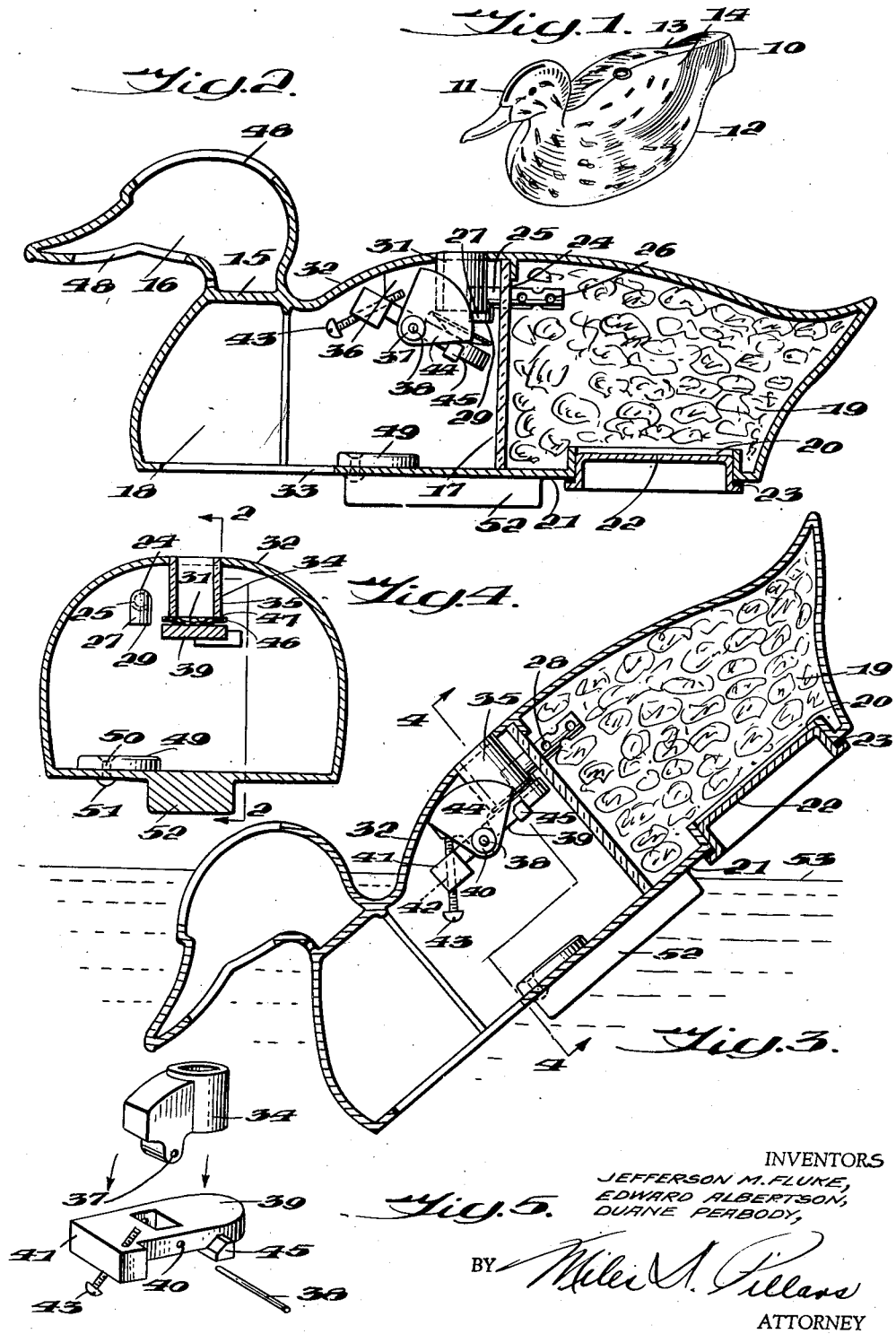
INVENTORS
JEFFERSON M. FLUKE,
EDWARD ALBERTSON,
DUANE PEABODY,
BY
ATTORNEY

United States Patent Office 2,814,898
Patented Dec. 3, 1957

2,814,898

DIVING DUCK DECOYS

Jefferson M. Fluke, Seattle, Wash., and Edward Albertson, Oswego, and Duane Peabody, Portland, Oreg., assignors to Ducking Ducks Incorporated, Portland, Oreg.

Application May 20, 1954, Serial No. 431,128

14 Claims. (Cl. 43—3)

This invention relates to duck decoys. More particularly, this invention relates to artificial duck decoys having relative motion so as to partially simulate the normal motions of a live duck upon water.

It has been found that the most effective animation of an artificial decoy is a simulation of the diving, feeding motion. Such simulated motion acts more positively to decoy a flight of fowl than wing flapping, swimming or other similar diverse forms of motion.

It is, therefore, the object of this invention to provide an artificial decoy which will simulate the diving, feeding motion of a live migratory fowl. More particularly, it is an object hereof to provide a gas operated diving decoy.

It is a further object of this invention to provide such a decoy wherein the periodicity of diving repetition may be readily varied and wherein there is provided a positive and simple mechanism for accomplishing the diving action.

A further object of this invention is the provision of a rugged, inexpensive structure for carrying out the foregoing objects.

Further objects and advantages of the invention will be readily apparent from an examination of the following detailed specification taken in conjunction with the accompanying drawings, wherein:

Fig. 1 is a view in perspective of the decoy;

Fig. 2 is a sectional elevational view of the decoy in its upper or floating position taken on line 2—2 of Fig. 4;

Fig. 3 is a similar sectional elevational view of the decoy in its lower or diving position;

Fig. 4 is a front view of the valve and valve operating mechanism of the decoy taken on the line 4—4 of Figure 3; and Fig. 5 is a disassembled perspective view of the valve and valve operating mechanism of the decoy.

Referring to the drawings, and more particularly to Figure 1, the decoy in its entirety is designated by the numeral 10 and includes a head 11 and body 12. The shell of the decoy is preferably formed from two complementary halves 13 and 14 joined to produce a unitary simulation of a wild fowl.

Obviously, the exterior surface of the decoy 10 may be varied as to surface configuration, color and markings so as to best reproduce the appearance of the natural migratory fowl intended to be decoyed.

Preferably the material of which the shell is formed consists of a moldable, artificial plastic, since such materials are inexpensive, easily molded and usually possess strength and light weight, as well as being fluid proof.

The complementary halves of the shell are cemented, fusion joined or the like to produce a gas and liquid tight unitary structure having formed therein certain orifices and an operating mechanism, as described in detail hereafter.

The interior of the decoy is divided by partitions into compartments. Referring particularly to Figures 2 and 3, it will be seen that a fluid proof transverse partition 15 divides a compartment 16 formed in the neck and head of the decoy from the main interior of the decoy.

The main interior is divided by a similar fluid proof transverse partition 17 into front and rear compartments 18 and 19. It is desirable that the partition 17 be molded in two halves, one with each half 13 and 14, and that the two halves of the partition be cemented or otherwise joined together. Preferably the partition 17 is formed of a rigid plastic material such as Lucite or the like. The utilization of such material also insures the reinforcement of the exterior shell without materially adding to the overall weight of the decoy. It is, of course, possible to form the partition in one piece and cement or otherwise join this piece to the two shell halves.

Rear compartment 19 is the gas producing chamber. Any of the well known gas producing agents may be utilized therein. In the preferred embodiment illustrated and described herewith, compartment 19 is filled with solid carbon dioxide which is commonly referred to as Dry Ice. This is accomplished by insertion of the Dry Ice through an opening 20 in the bottom wall 21 of the decoy. This opening is rendered fluid tight by a standard closure 22 having threaded or other similar engagement with opening 20 and preferably sealed by gasket 23 or the like.

It is obvious that evaporative gas producing substances other than carbon dioxide, such, for example, as aliphatic halides may be employed. In similar manner various liquid contact gas producing substances such as carbides may be used to fill compartment 19. If the latter class of substances are utilized, then closure 22 is provided with a grill or screen to allow limited access of fluid to chamber 19 in a manner well known to the art.

Formed in partition 17 is an opening or passage 24, and inserted in fluid proof relation in said opening is a hollow tube 25. As illustrated in Figures 2 and 3, tube 25 has a horizontally extending portion 26 and a vertically downwardly extending portion 27. Horizontal section 26 extends through partition 17 and has formed in the rear compartmental portion thereof a series of axially and horizontally spaced openings 28. At the downward and forward end 29 thereof the tube 25 leads into compartment 18.

Basically this compartment 18 includes an upper opening or passage 31 formed in the upper wall 32 of the decoy and a lower opening or passage 33 formed in the bottom wall 21. Preferably opening 33 is positioned at or near the forward portion of the body 12 in the lower wall 21 and at the lateral center thereof.

Depending from the upper wall 32 into compartment 18 is a valve mechanism for the opening 31, indicated in its entirety as 34 and best illustrated in Figure 4. In the illustrated preferred embodiment the valve is formed in the main of Tenite #2 or other similar light and rigid plastic material.

Downwardly extending from opening 31 and joined in fluid tight relationship to upper wall 32 there is positioned a hollow tube 35. Also suspended from upper wall 32 is a supporting post 36 terminating at its lower end in a cylindrical bearing 37. If desired, post 36 and tube 35 may be formed of a single integral plastic casting or molding in order to facilitate certainty of operation and inexpensiveness of the decoy.

Passing through bearing 37 and supported thereby is a pin 38, formed preferably of a metal substantially non-corrosive in salt water. A platform 39, preferably formed of light plastic material, and having cast, machined or otherwise formed therein bearing ears 40, 40, one on either side thereof, is positioned in suspended pivotal relation to post 36 by pin 38 passing through bearings 40, 40 and bearing 37.

At the forward portion of platform 39 there is formed a block 41 having a threaded or similarly executed passage 42, and positioned in adjustable mating relation thereto is a screw 43 or the like. It will be apparent that passage 42 is preferably extended upwardly and rearwardly of the horizontal line of bottom wall 21.

Freely rotatably supported by pin 38 is an inversely positioned pendant weight 44 formed of a material having a specific gravity substantially greater than that of water, such, for example, as a non-salt water-corrosive metal. This pendant weight 44 may be supported adjacent to either vertical side of platform 39, or, if desired, two such weights may be carried thereby, one on either side thereof.

In either alternative construction a stop member or stop members 45 are formed, preferably integrally, on platform 39 rearward of pin 38 and positioned in the axial orbital path of weight or weights 44 to limit the rearward motion thereof. In like manner screw or screws 43 adjustably limit the forward pivotal movement of weight or weights 44.

At the upper rear surface of platform 39 there is positioned a valve seat 46. This seat is adapted to coact with the lower end 47 of tube 35 to effectively seal said lower end when the rear end of pivotally supported platform 39 is in its raised position. In the preferred illustrated embodiment valve seat 46 takes the form of a resilient circular dish gasket, biased upwardly and having a horizontally mating configuration relative to the lower end 47 of tube 35. It is obvious that any similar valve seat known in the art may be utilized.

Formed in the neck and head compartment 16 of the decoy 10 are a plurality of openings 48. These openings, the lowermost of which is substantially as low as the partition 15 when the decoy 10 is in a horizontal position, serve the function of readily admitting and emitting fluid into the head portion in order that the descension and ascension of the decoy may be expedited without substantial interference with the main operating mechanism.

Also fastened to lower wall 21 and preferably positioned in the forward compartment 18 is a balancing weight 49. The purpose of this weight is to adjust the center of gravity of the decoy so that it will normally be positioned in a horizontal plane. Accordingly, the weight, formed of a material having a high specific gravity relative to water, is a substantially flat circular disc having a vertical eccentrically positioned passage 50 therethrough, said weight being adjoined to said lower wall 21 by means of a pinion 51. The relative position of the balance weight may be adjusted either by internal manual rotation on a friction fit pinion or by external manual manipulation by means of a screw-pinion screw threaded into the bottom wall 21 from the exterior thereof.

Such an adjustment is necessitated for two obvious reasons. First, in the mass production of decoys identical or similar to those described and illustrated, it is readily apparent that no two products will have an identical center of gravity, resulting in uneven front to rear or side to side buoyant stability. Second, in the filling of the rear or gas producing chamber 19 it is readily apparent that no two utilizations of the identical operative decoy will produce an identical center or operation.

To aid in the stability of the buoyant decoy there is provided, as is customary, a weighted keel 52 attached to the lower center portion of bottom wall 21.

In operation, and assuming that rear compartment 19 has been filed with a gas producing substance, decoy 10 is placed on a surface of water 53; see Figure 3.

The combined weight of the portion of platform 39 and its adjuncts pivotally suspended rearwardly of pin 38 is greater than those portions pivotally suspended forwardly of pin 38 when the decoy is in a substantially horizontal position. Accordingly, weight 44 rotates rearwardly until it is in contact with stop member 45. This action positively insures the unseating of valve seat 46 from the lower end 47 of tube 35. Water freely enters front compartment 18 through opening 33 as air simultaneously escapes upwardly through tube 35 and opening 31 formed in upper wall 32.

Simultaneously water will fill compartment 16, entering through the lower openings 48 while air exits through the upper openings 48, expediting the filling of the forward portion of the decoy with water.

The forward portion, now filled with water, sinks and thus simulates a natural fowl diving for food. Obviously the rearward portion of the decoy is simultaneously elevated to enhance the illusion of natural action.

As the front portion of the decoy submerges, pivoting downwardly around an axis substantially rearwardly of pin 38 due to the latent buoyancy of rear compartment 19, the entire front portion of platform 39, including screw 43 and block 41, pivots forwardly and downwardly. The forward and downward movement of weight 44 is positively terminated by contact with adjustable screw 43.

When the front portion of platform 39 pivots forwardly and downwardly, the rear portion thereof is elevated, carrying valve seat 46 into operative sealing relationship with lower end 47 of tube 35. Thereafter gas cannot escape through tube 35 and consequently the gas subsequently produced in rear compartment 19 and educting via tube 25 into compartment 18 collects therein, forcing water from compartment 18 through passage 33. This gas increases the buoyancy of the forward portion of the decoy, gradually elevating the same until weight 44 again rotates rearwardly, striking stop member 45 which carries the rear portion of platform 39 and valve seat 46 rearwardly downwardly, thus opening compartment 18 to atmosphere via tube 35 and allowing the decoy to dive again.

As previously discussed, provision is made for adjustment of the rapidity of opening and closing of the gas escape valve in order to allow for variance of the periodicity of diving of the decoy. Thus adjustment consists essentially of the screw 43 which functions to limit the forward and downward orbital movement of weight 44 about pin 38.

It is readily apparent that, if screw 43 is screwed upwardly from a medial position, then weight 44 will be stopped from reaching as far downwardly and forwardly during the descent of the front portion of the decoy. Consequently, during elevation or gas actuated ascent it will fall rearwardly at a point spatially elevationally prior to similar actuation when screw 43 is in medial position. The result, therefore, is a shifting of platform 39 to open compartment 18 to atmosphere via tube 35 before the decoy has reached a completely horizontal position, thus accelerating the periodicity of repetitive diving.

A corresponding deceleration of diving is accomplished by adjustment of screw 43 downwardly from its medial position. In this regard it will be apparent that manipulation of adjusting eccentric weight 49 also can serve to adjust periodicity of diving, since any adjustment thereof shifts the pivotal diving center of the decoy. It is further pointed out that adjustment of both screw 43 and weight 49 can be readily accomplished, in the preferred embodiment, through opening 33.

Experience has demonstrated the desirability of open ings 28 in tube 25. The thusly formed tube is not conducive to clogging or stoppage by ice formation which can sometimes become prevalent, particularly where th decoy is utilized in freezing or near freezing climatic conditions.

Obviously, the simulated motion of the decoy of th present invention may have incorporated therewith othe known motion producing mechanisms or other know decoying mechanisms, such as duck calls, etc.

We claim:
1. A decoy, comprising, in combination: a hollow body, a transverse partition positioned within said body and dividing said body into front and rear compartments, a passage in said partition communicating with each of said compartments, a first fluid passage in the upper wall of said front compartment, a second fluid passage in the lower wall of said front compartment, valve means positioned in said front compartment in operative relation with said first fluid passage, and a pivotally mounted valve operator positioned in said front compartment in operative relation with said valve.

2. A diving duck decoy comprising, in combination: a gas producing chamber, a second chamber, a first fluid passage communicating with each of said chambers, an upper wall in said second chamber, a second fluid passage in said upper wall, a platform pivotally mounted in said second chamber, a valve seat carried by said platform and operatively positioned relative to said second fluid passage, a weight pivotally mounted adjacent to said platform for pivoting said platform, stop members on said platform positioned in the orbital path of said weight to limit the movement thereof, a lower wall in said second chamber, and a third fluid passage in said lower wall.

3. A diving duck decoy comprising, in combination: a gas producing chamber, a second chamber, a first fluid passage communicating with each of said chambers, an upper wall in said second chamber, a second fluid passage in said upper wall, a platform pivotally mounted in said second chamber, a valve seat carried by said platform and operatively positioned relative to said second fluid passage, a weight pivotally mounted adjacent to said platform for pivoting said platform, stop members on said platform positioned in the orbital path of said weight to limit the movement thereof, at least one of said stop members being adjustably positioned relative to said orbital path, a lower wall in said second chamber, and a third fluid passage in said lower wall.

4. A diving duck decoy comprising, in combination: a gas producing chamber, a second chamber, a fluid proof partition positioned between said chambers, a hollow tube positioned in said partition and communicating with each of said chambers, an upper wall in said second chamber, a second fluid passage in said upper wall, a platform pivotally mounted in said second chamber, a valve seat carried by said platform and operatively positioned relative to said second fluid passage, a weight pivotally mounted adjacent to said platform for pivoting said platform, a lower wall in said second chamber, and a third fluid passage in said lower wall.

5. A diving duck decoy comprising, in combination: a gas producing chamber, a second chamber, a fluid proof partition positioned between said chambers, a hollow tube positioned in said partition and communicating with each of said chambers, said tube having an axially and radially extending series of holes in the portion thereof which extends into said gas producing chamber, an upper wall in said second chamber, a second fluid passage in said upper wall, a platform pivotally mounted in said second chamber, a valve seat carried by said platform and operatively positioned relative to said second fluid passage, a weight pivotally mounted adjacent to said platform, for pivoting said platform, a lower wall in said second chamber, and a third fluid passage in said lower wall.

6. A diving duck decoy comprising, in combination; a gas producing chamber, a second chamber, a fluid proof partition positioned between said chambers, a hollow tube positioned in said partition and communicating with each of said chambers, an upper wall in said second chamber, a second fluid passage in said upper wall, a platform pivotally mounted in said second chamber, a valve seat carried by said platform and operatively positioned relative to said second fluid passage, a weight pivotally mounted adjacent to said platform for pivoting said platform, stop members on said platform positioned in the orbital path of said weight to limit the movement thereof, a lower wall in said second chamber, and a third fluid passage in said lower wall.

7. A diving duck decoy comprising, in combination: a gas producing chamber, a second chamber, a fluid proof partition positioned between said chambers, a hollow tube positioned in said partition and communicating with each of said chambers, said tube having an axially and radially extending series of holes in the portion thereof which extends into said gas producing chamber, an upper wall in said second chamber, a second fluid passage in said upper wall, a platform pivotally mounted in said second chamber, a valve seat carried by said platform and operatively positioned relative to said second fluid passage, a weight pivotally mounted adjacent to said platform for pivoting said platform, stop members on said platform positioned in the orbital path of said weight to limit the movement thereof, at least one of said stop members being adjustably positioned relative to said orbital path, a lower wall in said second chamber, and a third fluid passage in said lower wall.

8. A decoy comprising, in combination: a hollow body including a head and neck portion, a first fluid proof transverse partition positioned within said body and dividing said body into front and rear compartments, a second fluid proof transverse partition separating the neck and head portion from the remainder of said hollow body, a passage in said first partition communicating with each of said compartments, a first fluid passage in the upper wall of said front compartment, a second fluid passage in the lower wall of said front compartment, valve means positioned in said front compartment in operative relation with said first fluid passage, and means to operate said valve to close or open said first fluid passage.

9. A diving duck decoy comprising, in combination: a gas producing chamber, a second chamber, a first fluid passage communicating with each of said chambers, an upper wall in said second chamber, a second fluid passage in said upper wall, a platform pivotally mounted in said second chamber, a valve seat carried by said platform and operatively positioned relative to said second fluid passage, a weight pivotally mounted adjacent to said platform for pivoting said platform, a lower wall in said second chamber, a second weight supported on said lower wall and adjustably positioned thereon, and a third fluid passage in said lower wall.

10. A diving duck decoy comprising, in combination: a gas producing chamber, a second chamber, a first fluid passage communicating with each of said chambers, an upper wall in said second chamber, a second fluid passage in said upper wall, a platform pivotally mounted in said second chamber, a valve seat carried by said platform and operatively positioned relative to said second fluid passage, a weight pivotally mounted adjacent to said platform for pivoting said platform, a lower wall in said second chamber, a pinion mounted in said lower wall, a second weight eccentrically and adjustably supported by said pinion, and a third fluid passage in said lower wall.

11. A diving duck decoy comprising, in combination; a body, a chamber formed in said body and having upper and lower walls, a separate fluid passage positioned in each of said walls, a valve operatively positioned relative to said upper fluid passage, a source of gas positioned in said chamber, and pivotally mounted valve operating means positioned in said chamber.

12. A diving duck decoy comprising, in combination: a body, a chamber formed in said body and having upper and lower walls, a separate fluid passage positioned in each of said walls, a valve operatively positioned relative to said upper fluid passage, a source of gas positioned in said chamber, and pivotally mounted valve operating means positioned in said chamber, said valve operating means having a weight pivotally supported adjacent to said valve.

13. A diving duck decoy comprising, in combination: a body, a chamber formed in said body and having upper and lower walls, a separate fluid passage positioned in each of said walls, a valve operatively positioned relative to said upper fluid passage, a source of gas positioned in said chamber, pivotally mounted valve operating means positioned in said chamber, said valve operating means having a weight pivotally supported adjacent to said valve, and stop members carried by said valve operating means and positioned in the orbital path of said weight.

14. A diving duck decoy comprising, in combination: a body, a chamber formed in said body and having upper and lower walls, a separate fluid passage positioned in each of said walls, a valve operatively positioned relative to said upper fluid passage, a source of gas positioned in said chamber, pivotally mounted valve operating means positioned in said chamber, said valve operating means having a weight pivotally supported adjacent to said valve, and stop members carried by said valve operating means and positioned in the orbital path of said weight, at least one of said stop members being adjustably positioned relative to said path.

References Cited in the file of this patent

UNITED STATES PATENTS

| | | |
|---|---|---|
| 243,954 | North | July 5, 1881 |
| 1,220,551 | Powell | Mar. 27, 1917 |
| 2,093,144 | Brunell | Sept. 14, 1937 |
| 2,224,650 | Holloway | Dec. 10, 1940 |
| 2,243,568 | Middler | May 27, 1941 |
| 2,415,742 | Hiltabidel | Feb. 11, 1947 |
| 2,591,554 | Kinney | Apr. 1, 1952 |
| 2,716,830 | Burden | Sept. 6, 1955 |